US012574668B2

(12) United States Patent
Su et al.

(10) Patent No.: US 12,574,668 B2
(45) Date of Patent: Mar. 10, 2026

(54) HEADPHONE WITH EXTERNAL ACCESSORY

(71) Applicant: PRIMAX ELECTRONICS LTD., Taipei City (TW)

(72) Inventors: Chun-Nan Su, Taipei City (TW); Chun-Che Wu, Taipei City (TW); Yao-Chung Hsieh, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 191 days.

(21) Appl. No.: 18/676,538

(22) Filed: May 29, 2024

(65) Prior Publication Data

US 2025/0338053 A1 Oct. 30, 2025

(30) Foreign Application Priority Data

Apr. 26, 2024 (CN) ........................ 202410512226.3

(51) Int. Cl.
*H04R 1/04* (2006.01)
*H04R 1/08* (2006.01)
*H04R 1/10* (2006.01)

(52) U.S. Cl.
CPC ............... *H04R 1/083* (2013.01); *H04R 1/04* (2013.01); *H04R 1/1008* (2013.01)

(58) Field of Classification Search
CPC ......... H04R 1/083; H04R 1/04; H04R 1/1008
See application file for complete search history.

(56) References Cited

U.S. PATENT DOCUMENTS

| | | | | |
|---|---|---|---|---|
| 2005/0129259 A1* | 6/2005 | Garner | H04R 29/008 381/361 |
| 2009/0195479 A1* | 8/2009 | Kato | H04R 1/028 381/309 |
| 2010/0040252 A1* | 2/2010 | Thompson | H04R 1/083 381/375 |
| 2015/0092974 A1* | 4/2015 | Almeflo | H04R 1/28 381/346 |
| 2020/0288234 A1* | 9/2020 | Fletcher | H04R 1/1008 |

* cited by examiner

*Primary Examiner* — Suhan Ni
(74) *Attorney, Agent, or Firm* — WPAT, PC

(57) ABSTRACT

A headphone includes a body connection portion and an external accessory. The body connection portion includes a first circuit board, at least one first connection terminal and a first joint member. The external accessory is able to be detachably assembled to the body connection portion and includes a second circuit board, at least one second connection terminal configured to electrically connect to the at least one first connection terminal and a second joint member configured to join to the first joint member. After the first and second joint members are joined to each other and the first and second connection terminals are electrically connected to each other, when the external accessory is rotated, the first joint member is rotated, and the first circuit board and the at least one first connection terminal are also rotated.

10 Claims, 5 Drawing Sheets

HEADPHONE WITH EXTERNAL ACCESSORY

FIELD OF THE INVENTION

The present invention relates to a headphone with an external accessory.

BACKGROUND OF THE INVENTION

There are some headphones with external accessories on the market, and an angle of the external accessory can be adjusted. However, when the external accessory is rotated to adjust the angle, its conductive contact pads rub against conductive contact pads of the headphone, causing wear of the conductive contact pads and reducing their service life. Therefore, current headphones with external accessories still need to be improved.

SUMMARY OF THE INVENTION

The present invention provides a headphone, which includes a body connection portion and an external accessory. The body connection portion includes a first circuit board; at least one first connection terminal, located on the first circuit board; and a first joint member, adjacent to the at least one first connection terminal. The external accessory is able to be detachably assembled to the body connection portion and includes: a second circuit board; at least one second connection terminal, located on the second circuit board, in which the at least one second connection terminal is configured to be electrically connected to the at least one first connection terminal; and a second joint member, adjacent to the at least one second connection terminal, in which the second joint member is configured to join to the first joint member. After the first joint member and the second joint member are joined to each other and the at least one first connection terminal and the at least one second connection terminal are electrically connected to each other, when the external accessory including the second circuit board, the at least one second connection terminal and the second joint member is rotated, the first joint member is rotated, and the first circuit board and the at least one first connection terminal are also rotated.

In some embodiments of the present invention, the body connection portion further includes: a rotatable member, having an outer receiving region, a first through hole and an inner receiving region, in which the first through hole is connected between the outer receiving region and the inner receiving region, and the first circuit board is located in the inner receiving region and covers the first through hole, and the at least one first connection terminal is through the first through hole and is located in the outer receiving region, and the first joint member is located in the outer receiving region and is separated from the least one first connection terminal.

In some embodiments of the present invention, the first joint member surrounds the at least one first connection terminal.

In some embodiments of the present invention, a width of the outer receiving region is greater than a width of the inner receiving region, and a width of the inner receiving region is greater than a width of the first through hole.

In some embodiments of the present invention, the body connection portion further includes: a bearing member, having a recess, in which the rotatable member is rotatably received in the recess of the bearing member.

In some embodiments of the present invention, the at least one first connection terminal is at least one Pogo pin or at least one conductive spring piece.

In some embodiments of the present invention, the external accessory further includes: a receiving member, having a second through hole and an annular region surrounding the second through hole, in which the second circuit board covers the second through hole, and the second joint member is located in the annular region and is separated from the at least one second connection terminal.

In some embodiments of the present invention, the external accessory further includes: a wire, located in the second through hole and connected to the second circuit board.

In some embodiments of the present invention, the first joint member and the second joint member are a first annular magnetic member and a second annular magnetic member, respectively.

In some embodiments of the present invention, the first annular magnetic member includes two first half-ring portions with different magnetic properties, and the second annular magnetic member includes two second half-ring portions with different magnetic properties.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
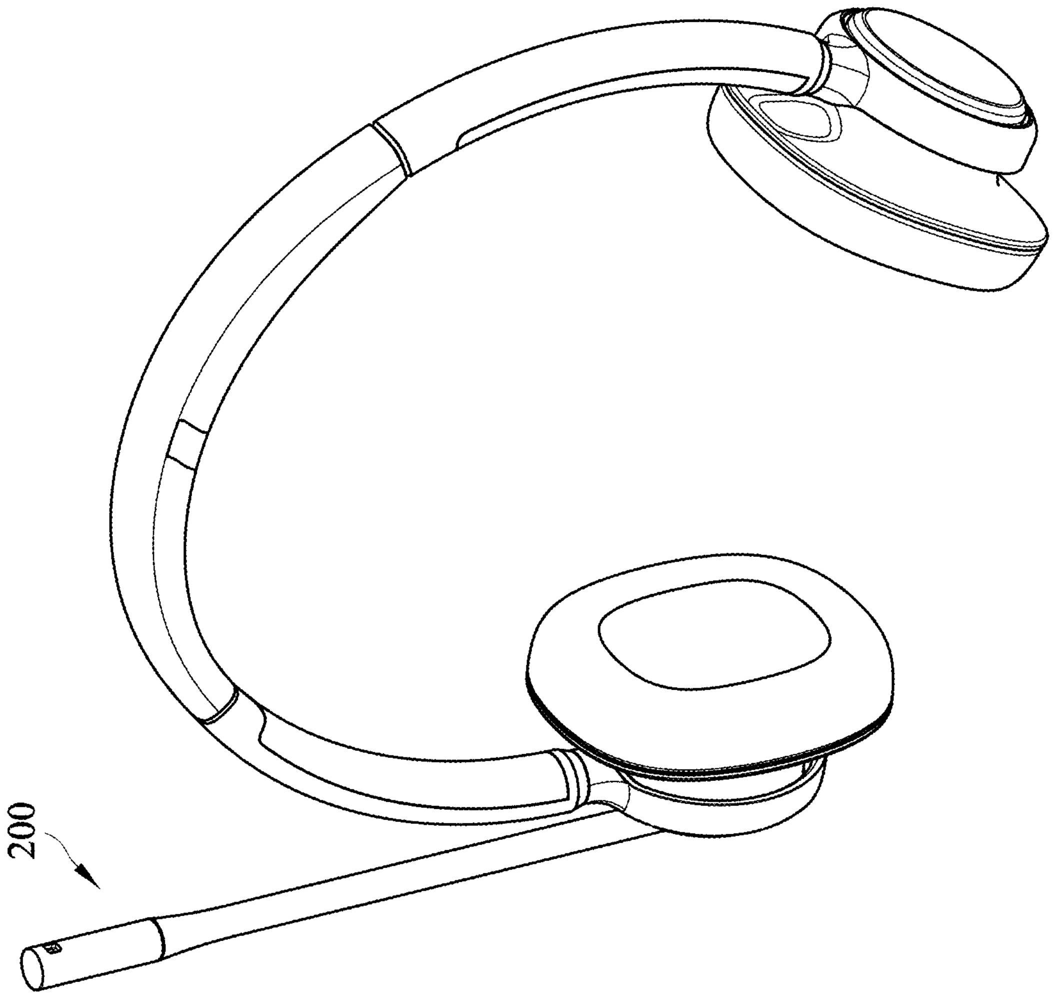
FIG. 1 is a schematic diagram of appearance of a headphone according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, there are some headphones with external accessories on the market, and an angle of the external accessory can be adjusted. However, when the external accessory is rotated to adjust the angle, its conductive contact pads rub against conductive contact pads of the headphone, causing wear of the conductive contact pads and reducing their service life. Therefore, current headphones with external accessories still need to be improved. Accordingly, the present invention provides a headphone, which includes a body connection portion and an external accessory. After the external accessory is detachably assembled on the body connection portion, when the external accessory is rotated, the body connection portion can also be rotated synchronously, so conductive contact pads of the external accessory do not rub against with conductive contact pads of the body connection portion. As such, the conductive contact pads of the external accessory and the conductive contact pads of the body connection portion of the headphone can have a longer service life. Various embodiments of the headphones of the present invention will be described in detail below.

Figure 2:
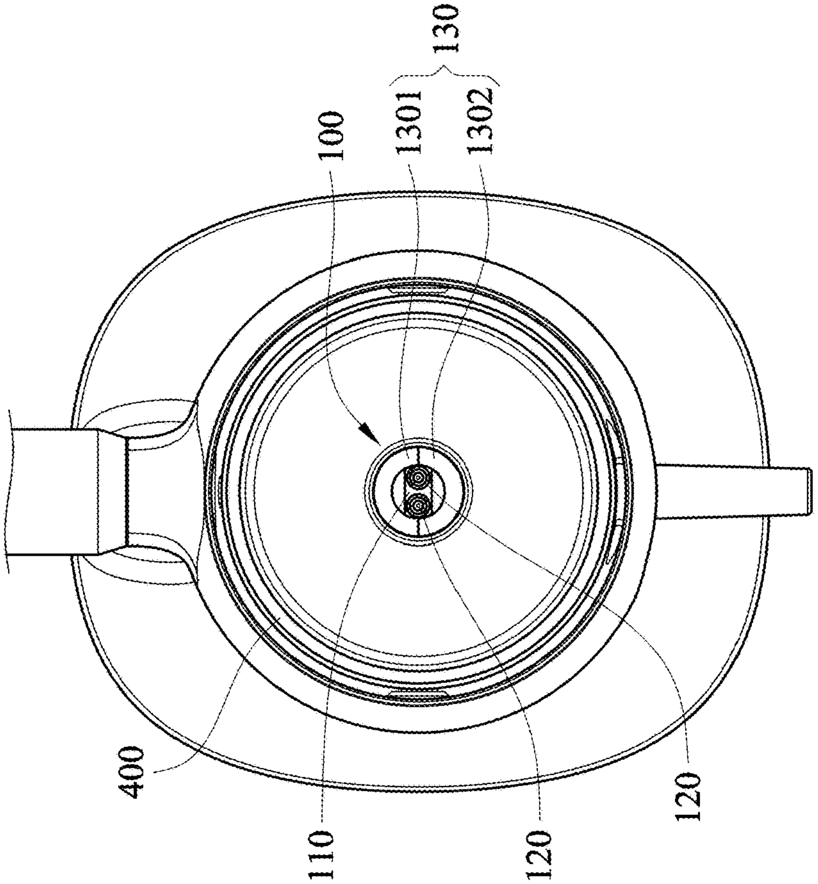
FIG. 2 is a schematic diagram of appearance of a body connection portion according to an embodiment of the present invention.

FIG. 1 is a schematic diagram of appearance of a headphone according to an embodiment of the present invention. FIG. 2 is a schematic diagram of appearance of a body connection portion according to an embodiment of the present invention. As shown in FIGS. 1 and 2, the headphone includes a body connection portion 100 and an external accessory 200.

Figure 3:
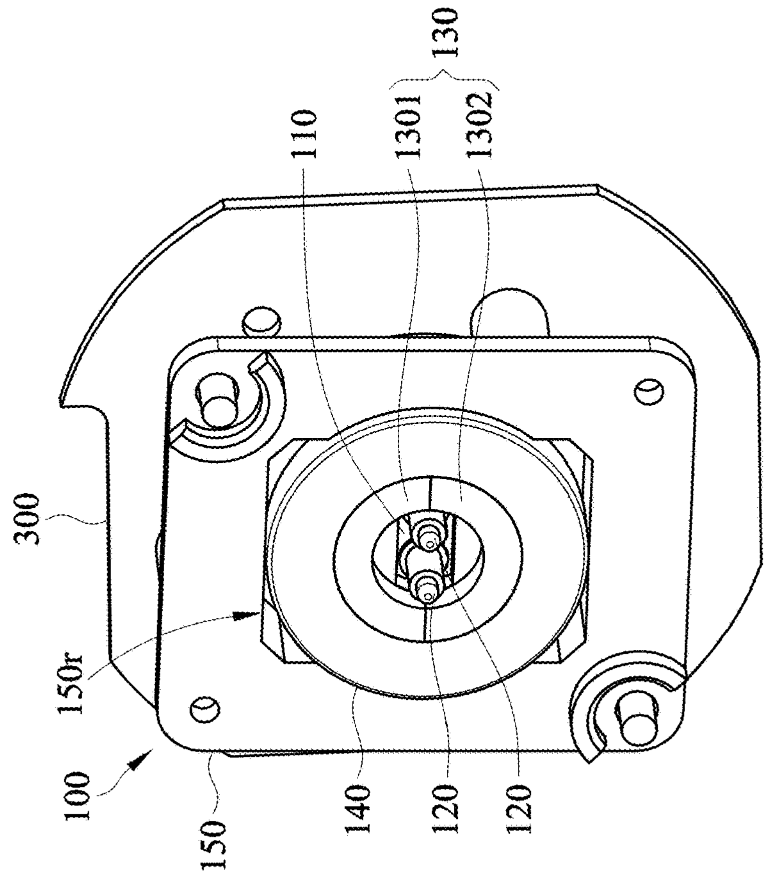
FIG. 3 is a perspective view of a body connection portion according to an embodiment of the present invention.
Figure 4:
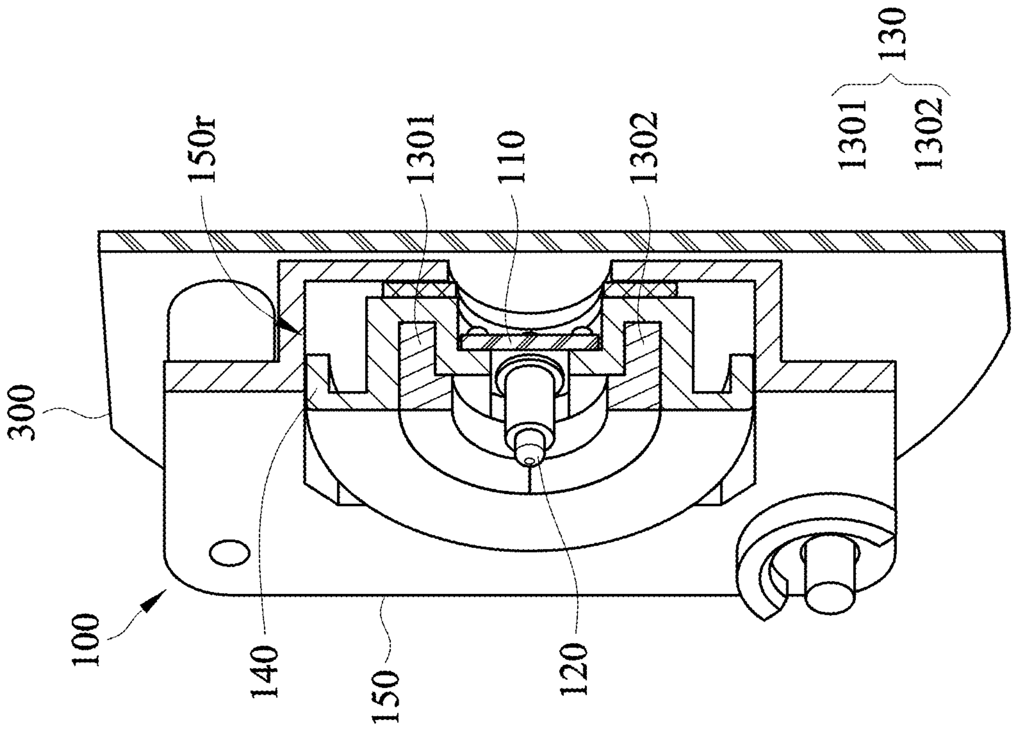
FIG. 4 is a cross-sectional view of a body connection portion according to an embodiment of the present invention.

FIG. 3 is a perspective view of a body connection portion according to an embodiment of the present invention. FIG. 4 is a cross-sectional view of a body connection portion according to an embodiment of the present invention. As shown in FIGS. 2 to 4, the body connection portion 100 includes a first circuit board 110, at least one first connection terminal 120 and a first joint member 130.

The at least one first connection terminal 120 is located on the first circuit board 110. In some embodiments, the at least one first connection terminal 120 is at least one Pogo pin, at least one conductive spring piece, or another suitable conductive contact member. In some embodiments, the at least one first connection terminal 120 is two first connection terminals 120 that are separated from each other.

The first joint member 130 is adjacent to the at least one first connection terminal 120. In some embodiments, the first joint member 130 surrounds the at least one first connection terminal 120. In some embodiments, the first joint member 130 is a first annular magnetic member. In some embodiments, the first annular magnetic member includes two first half-ring portions 1301 and 1302 with different magnetic properties. In some embodiments, the first annular magnetic member is composed of the two first half-ring portions 1301 and 1302 with different magnetic properties.

Figure 5:
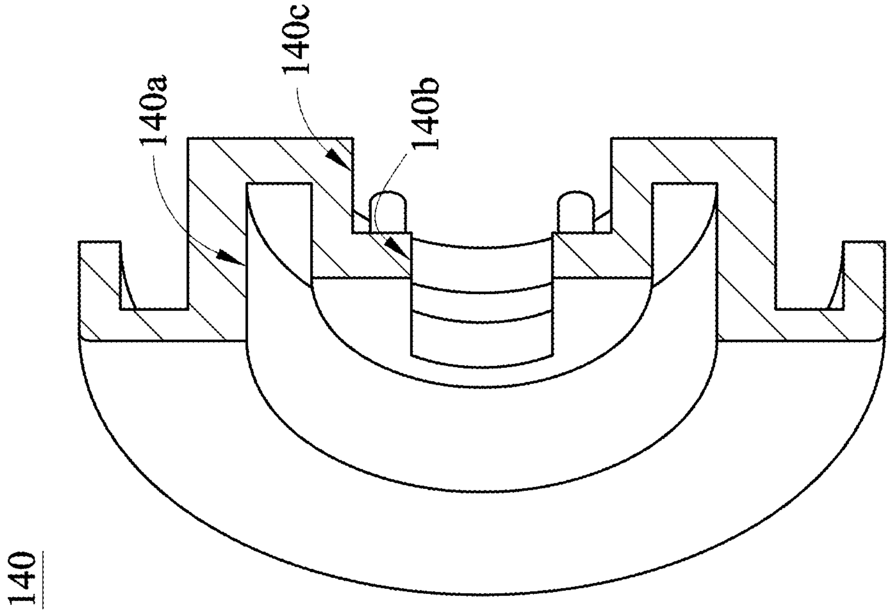
FIG. 5 is a cross-sectional view of a rotatable member according to an embodiment of the present invention.

FIG. 5 is a cross-sectional view of a rotatable member according to an embodiment of the present invention. In some embodiments, as shown in FIG. 5, the body connection portion 100 further includes a rotatable member 140, which has an outer receiving region 140*a*, a first through hole 140*b* and an inner receiving region 140*c*. The first through hole 140*b* is connected between the outer receiving region 140*a* and the inner receiving region 140*c*. In some embodiments, as shown in FIGS. 3 to 5, the first circuit board 110 is located in the inner receiving region 140*c* and covers the first through hole 140*b* (e.g., covers the inside of the first through hole 140*b*); the at least one connection terminal 120 is through the first through hole 140*b* and is located in the outer receiving region 140*a*; the first joint member 130 is located (fixed) in the outer receiving region 140*a* and is separated from the at least one first connection terminal 120. In some embodiments, the rotatable member 140 isolates the first joint member 130 and the first circuit board 110. In some embodiments, as shown in FIG. 5, a width of the outer receiving region 140*a* is greater than a width of the inner receiving region 140*c*, and the width of the inner receiving region 140*c* is greater than a width of the first through hole 140*b*.

In some embodiments, as shown in FIGS. 3 and 4, the body connection portion further includes a bearing member 150, which has a recess 150*r*, and the rotatable member 140 is rotatably received in the recess 150*r* of the bearing member 150.

In some embodiments, the headphone further includes a main circuit board 300, and the bearing member 150 is fixed on the main circuit board 300. However, the present invention is not limited to the foregoing embodiments. In other embodiments, the bearing member 150 may be fixed on another suitable component.

In some embodiments, referring to FIGS. 2 and 3, the headphone further includes a cover 400, which covers the rotatable member 140 and the bearing member 150 and fixed on the bearing member 150, and has a through opening (refer to FIG. 2, not labeled) exposing the at least one first connection terminal 120 and the first joint member 130. As such, when the external accessory 200 is removed from the body connection portion 100, the rotatable member 140 will not fall out.

Figure 7:
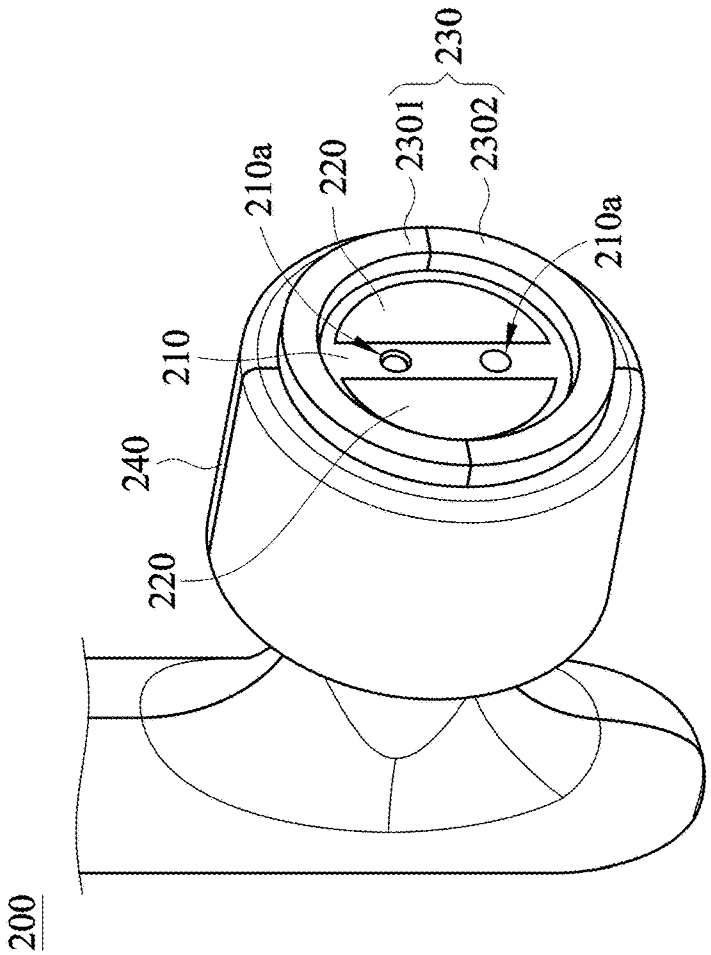
FIG. 7 is a perspective view of an external accessory according to an embodiment of the present invention.
Figure 6:
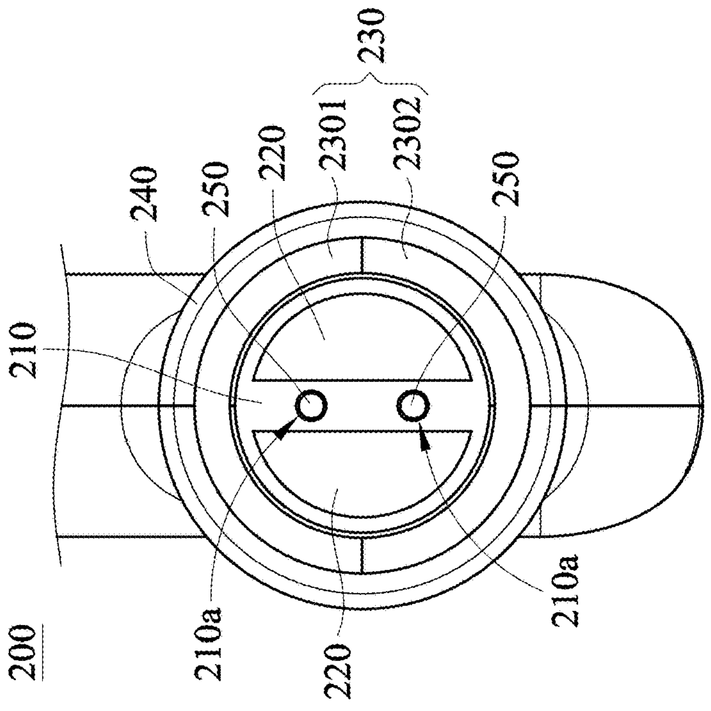
FIG. 6 is a schematic diagram of appearance of an external accessory according to an embodiment of the present invention.
Figure 8:
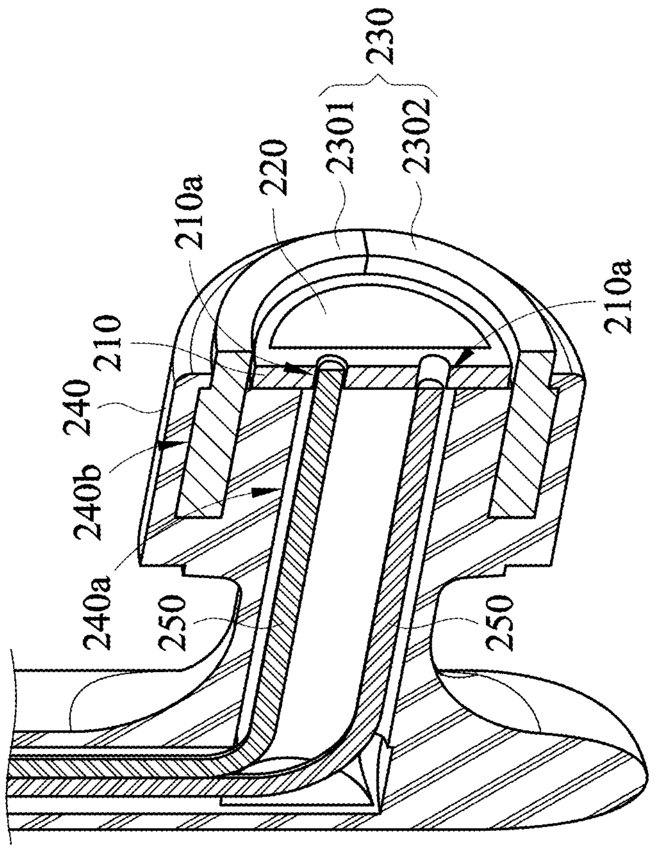
FIG. 8 is a cross-sectional view of an external accessory according to an embodiment of the present invention.

FIG. 6 is a schematic diagram of appearance of an external accessory according to an embodiment of the present invention. FIG. 7 is a perspective view of an external accessory according to an embodiment of the present invention. FIG. 8 is a cross-sectional view of an external accessory according to an embodiment of the present invention. As shown in FIGS. 2, 3, 6, 7 and 8, the external accessory 200 can be detachably assembled to the body connection portion 100. As shown in FIGS. 6 to 8, the external accessory 200 includes a second circuit board 210, at least one second connection terminal 220 and a second joint member 230.

The at least one second connection terminal 220 is located on the second circuit board 210 and is configured to be electrically connected to the at least one first connection terminal 120.

The second joint member 230 is adjacent to the at least one second connection terminal 220 and is configured to join to the first joint member 130. In some embodiments, the second joint member 230 is a second annular magnetic member. In some embodiments, the second annular magnetic member includes two second half-ring portions 2301 and 2302 with different magnetic properties, which can attract each other with the two first half-ring portions 1301 and 1302, respectively. In some embodiments, the second annular magnetic member is composed of the two second half-ring portions 2301 and 2302 with different magnetic properties.

In some embodiments, as shown in FIG. 8, the external accessory 200 further includes a receiving member 240, which has a second through hole 240*a* and an annular region 240*b* surrounding the second through hole 240*a*. The second circuit board 210 covers the second through hole 240*a* (e.g., covers the outside of the second through hole 240*a*), and the second joint member 230 is located in the annular region 240*b* and is separated from the at least one second connection terminal 220. In some embodiments, the second joint member 230 and the second circuit board 210 are adjacent to each other but separated from each other.

In some embodiments, as shown in FIGS. 6 and 8, the external accessory 200 further includes a wire 250, which is located in the second through hole 240*a* and connected to the second circuit board 210. In some embodiments, the wire 250 is used as a microphone signal wire, which is electrically connected to the at least one second connection terminal 220 through a wire (not shown) in the second circuit board 210 to transmit microphone signals to the second connection terminal 220. In some embodiments, the external accessory 200 further includes another wire 250 used as a ground wire.

Please refer to FIGS. 2 to 4 and 6 to 8, after the first joint member 130 and the second joint member 230 are joined to each other and the at least one first connection terminal 120 and the at least one second connection terminal 220 are electrically connected to each other, when the external accessory 200 including the second circuit board 210, the at least one second connection terminal 220 and the second joint member 230 is rotated, the first joint member 130 is rotated, and the first circuit board 110 and the at least one first connection terminal 120 are also rotated. As such, the at least one first connection terminal 120 and the at least one second connection terminal 220 do not rub against each other, and thus the at least one first connection terminal 120 and the at least one second connection terminal 220 can have a longer service life.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A headphone, comprising:

a body connection portion, comprising:

a first circuit board;

at least one first connection terminal, located on the first circuit board; and a first joint member, adjacent to the at least one first connection terminal; and an external accessory, able to be detachably assembled to the body connection portion and comprising:

a second circuit board;

at least one second connection terminal, located on the second circuit board, wherein the at least one second connection terminal is configured to be electrically connected to the at least one first connection terminal; and a second joint member, adjacent to the at least one second connection terminal, wherein the second joint member is configured to join to the first joint member, wherein after the first joint member and the second joint member are joined to each other and the at least one first connection terminal and the at least one second connection terminal are electrically connected to each other, when the external accessory comprising the second circuit board, the at least one second connection terminal and the second joint member is rotated, the first joint member is rotated, and the first circuit board and the at least one first connection terminal are also rotated.

2. The headphone of claim 1, wherein the body connection portion further comprises:

a rotatable member, having an outer receiving region, a first through hole and an inner receiving region, wherein the first through hole is connected between the outer receiving region and the inner receiving region, and the first circuit board is located in the inner receiving region and covers the first through hole, and the at least one first connection terminal is through the first through hole and is located in the outer receiving region, and the first joint member is located in the outer receiving region and is separated from the least one first connection terminal.

3. The headphone of claim 2, wherein the first joint member surrounds the at least one first connection terminal.

4. The headphone of claim 2, wherein a width of the outer receiving region is greater than a width of the inner receiving region, and a width of the inner receiving region is greater than a width of the first through hole.

5. The headphone of claim 2, wherein the body connection portion further comprises:

a bearing member, having a recess, wherein the rotatable member is rotatably received in the recess of the bearing member.

6. The headphone of claim 2, wherein the at least one first connection terminal is at least one Pogo pin or at least one conductive spring piece.

7. The headphone of claim 1, wherein the external accessory further comprises:

a receiving member, having a second through hole and an annular region surrounding the second through hole, wherein the second circuit board covers the second through hole, and the second joint member is located in the annular region and is separated from the at least one second connection terminal.

8. The headphone of claim 7, wherein the external accessory further comprises:

a wire, located in the second through hole and connected to the second circuit board.

9. The headphone of claim 1, wherein the first joint member and the second joint member are a first annular magnetic member and a second annular magnetic member, respectively.

10. The headphone of claim 9, wherein the first annular magnetic member comprises two first half-ring portions with different magnetic properties, and the second annular magnetic member comprises two second half-ring portions with different magnetic properties.

* * * * *